(12) United States Patent
Leung et al.

(10) Patent No.: US 7,313,573 B2
(45) Date of Patent: Dec. 25, 2007

(54) DIAGNOSIS OF EQUIPMENT FAILURES USING AN INTEGRATED APPROACH OF CASE BASED REASONING AND RELIABILITY ANALYSIS

(75) Inventors: Ying Tat Leung, Tarrytown, NY (US); Gyana Ranjan Parija, Poughkeepsie, NY (US); Samir Sharma, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 10/663,907

(22) Filed: Sep. 17, 2003

(65) Prior Publication Data

US 2005/0060323 A1   Mar. 17, 2005

(51) Int. Cl.
*G06F 7/00*    (2006.01)
*G06F 11/00*   (2006.01)

(52) U.S. Cl. ..................... 707/104.1; 714/26
(58) Field of Classification Search .............. 707/6; 714/1, 37; 706/45; 708/160
See application file for complete search history.

(56) References Cited

U.S. PATENT DOCUMENTS

| 5,581,694 | A |    | 12/1996 | Iverson et al. ............... 714/26 |
| 5,761,497 | A |    | 6/1998 | Holt et al. ................. 707/5 |
| 6,125,453 | A | *  | 9/2000 | Wyss .......................... 714/1 |
| 6,571,236 | B1 |   | 5/2003 | Ruppelt ...................... 707/3 |
| 6,584,455 | B1 | * | 6/2003 | Hekmatpour ............... 706/45 |
| 2003/0061212 | A1 | * | 3/2003 | Smith et al. ............... 707/6 |
| 2003/0208514 | A1 | * | 11/2003 | Yang et al. ............... 708/160 |
| 2004/0250166 | A1 | * | 12/2004 | Dahlquist et al. ............ 714/37 |

OTHER PUBLICATIONS

Hennessy et al., "Appliying case-based reasoning to autoclave loading", IEEE Expert, Oct. 1992, pp. 21-26.
Vollrath et al., "Case-based reasoning support for online catalog sales", IEEE Internet Computing, Jul./Aug. 1998, pp. 47-54.
Magaldi, "CBR for troubleshooting aircraft on the flight line", Proceedings of the IEEE Colloquium on Case-Based Reasoning: Prospectf for Applications, Digest No. 1994/057, pp. 6/1-6/9.
Portinale et al., "ADAPtER, An Integrated Diagnostic System Combining Case-Based and Abductive Reasoning", Proc. First International Converence on Case-Based Reasoning-ICCBR 95, Sesimbra, Lecture Notes in Artificail Intelligence 1010, pp. 277-288.
Tirri et al., "A bayesian framework for case-based reasoning", Proceedings of the 3rd European Workshop on Case-Based Reasoning, Lausanne, Switzerland, Nov. 1996.

* cited by examiner

*Primary Examiner*—Susan Chen
(74) *Attorney, Agent, or Firm*—Whitham, Curtis, Christofferson & Cook, PC; Stephen C. Kaufman

(57) ABSTRACT

Equipment failures are diagnosed using an integrated approach of case-based reasoning (CBR) and statistical reliability analysis. The method outputs a single list of suggested failed components, ranked by an overall probability of failure, and their associated past solutions from the case base. The overall probability of failure is calculated using the combined logic of case based reasoning and statistical reliability analysis. The method is typically used in a real-time decision support system to aid equipment diagnosis by a maintenance technician working in the field.

2 Claims, 3 Drawing Sheets

DIAGNOSIS OF EQUIPMENT FAILURES USING AN INTEGRATED APPROACH OF CASE BASED REASONING AND RELIABILITY ANALYSIS

BACKGROUND OF THE INVENTION

1. Field of the Invention

The present invention relates to decision support software in diagnosing equipment failures, such as the cases when production equipment fails unexpectedly. This invention provides a method to be used in a computational engine to help the user pinpoint the failed component in a complex machine with a large number of components.

2. Background Description

Consider the situation when a piece of equipment, such as a machine on the production shop floor, has failed. An immediate task is to diagnose the failure to determine what needs to be done to bring the equipment back to a running state. In particular, the failed component(s), among the possibly large number of candidates, have to be identified and then repaired or replaced. We focus on the first step: diagnosis where the failed component(s) is identified. When the equipment is relatively simple (such as a household appliance) or when the repair technician is highly skilled and experienced, this diagnosis is usually straightforward and quick. When the equipment is complex with many failure modes (such as computer-controlled production equipment, aircraft, or large scale computing equipment), and/or when the repair technician is less experienced (such as the case in many industries where labor turnover is high), the diagnosis task may take considerable time. Further, failures may often be diagnosed incorrectly, resulting in wasted time and resources of replacing a working part and another iteration of diagnosis-repair. On the other hand, in many industries (e.g., semiconductor manufacturing, airlines, critical data centers) unexpected down time of equipment can be very costly.

SUMMARY OF THE INVENTION

It is therefore an object of this invention to provide a method to be used in a computational engine for real-time decision support to a repair technician.

This invention provides a method to be used in a computational engine for real-time decision support to the repair technician. It gives a list of suggested failed components in the equipment, ordered by decreasing probability of failure, based on historical failure data (of that particular machine or other more general data) and the symptom of the failure at hand input by the technician. It helps the technician quickly focus on a few highly probable failed components and therefore reduces the diagnosis time. It also improves the probability that the failed component(s) is correctly identified, reducing the need for further repair or a subsequent failure due to the same, unfixed problem.

The diagnosis method of this invention integrates two distinct approaches: case based reasoning (CBR) from the computer science discipline and reliability analysis from the industrial statistics discipline. The integrated approach provides a single, consistent mathematical framework in which these two distinct approaches interact and contribute. The invention provides a single, consistent list of output (suggested failed components), taking advantage of the merits of both approaches.

Case based reasoning (CBR) is an approach to build a knowledge-based system to help solve a problem by using past solutions to similar problems encountered. A basic introduction to this approach is contained in I. Watson, *Applying Case-Based Reasoning: Techniques for Enterprise Systems*, Morgan Kaufmann Publishers, San Francisco (1997). The approach has been successfully used in practice in a range of applications, such as production machine loading (D. Hennessy and D. Hinkle, "Applying case-based reasoning to autoclave loading", *IEEE Expert*, October 1992, pp. 21-26), customer service help desks (ibid., Watson 1997, Chapter 5), online catalog sales (I. Vollrath, W. Wilke and R. Bergman, "Case-based reasoning support for online catalog sales", *IEEE Internet Computing*, July/August 1998, pp. 47-54). In particular, CBR has been used in equipment diagnostics, such as aircraft troubleshooting (R. V. Magaldi, "CBR for troubleshooting aircraft on the flight line", *Proceedings of the IEEE Colloquium on Case-Based Reasoning: Prospects for Applications*, Digest No. 1994/057, pp. 6/1-6/9), or consumer product problem diagnosis (U.S. Pat. No. 6,571,236 to K. M. Ruppelt for "Method and Apparatus for Problem Diagnosis and Solution", issued May 2003). It has also been combined with other artificial intelligence techniques to perform diagnostics (e.g., L. Portinale and P. Torasso, "ADAPtER, An Integrated Diagnostic System Combining Case-Based and Abductive Reasoning", *Proc. First International Conference on Case-Based Reasoning-ICCBR 95*, Sesimbra, Lecture Notes in Artificial Intelligence 1010, pp. 277-288). A number of CBR engines are commercially available, such as Kaidara Advisor from Kaidara Software Inc., ReCall from ISoft, k-Commerce from Inference Corp., Case Advisor from Sentenitia Software Inc., ReMind from Cognitive Systems Inc., CPR++ from Haley Enterprises.

From a practical point of view, the advantages of CBR are as follows.

1. The basic approach of CBR is rooted in psychology and is strongly inspired by how humans solve problems. The approach therefore appears natural, easily understood, and readily accepted by the user.
2. It makes use of solutions that were used successfully in the past, taking advantage of the know-how of a group of people (e.g., the entire equipment maintenance organization within a business).
3. Compared to other approaches to a rule-based expert system, a CBR system requires much less maintenance effort over time and yet still makes use of the latest data sent to the system.

Statistical reliability analysis is a well-established area in the field of industrial statistics (see, e.g., R. E. Barlow, *Engineering Reliability*, Society for Industrial and Applied Mathematics and American Statistical Association, 1998). It provides a set of mathematical techniques to perform quantitative analysis of the reliability of an engineering system (such as a machine) built from a set of components. A number of software packages are commercially available to perform such analysis, such as FRACAS from Relex, suite of software packages from ReliaSoft, RAM Commander from SoHar, QuART from Quanterion Solutions, modules in general purpose statistical packages such as SAS from SAS Institute or S-plus from Insightful Corp.

From a practical point of view, the advantages of reliability analysis are as follows:

1. It provides a set of techniques to compute quantitative measures of reliability (e.g., probability of failure of a component or a system) from a set of historical failure data collected over time. These numbers provide insight to solving the maintenance problem at hand (i.e., diagnosing failures). Clear-cut ranking is possible with such measures.

2. The quantitative measures provide an opportunity for further analysis, such as maintenance optimization or failure prediction.

3. Depending on the level of detail of the historical data, reliability measures can be computed at the component level and then used to predict the reliability of a new system using a set of known components.

4. Some of the commonly used reliability measures (e.g., mean time to failure) are published for standard components (e.g., standard electronic parts) or are available from their vendors. These published figures can be used as a reference or as a starting point for analyzing a specific system at hand.

Other forms of reliability analysis have been used in the context of a knowledge-based system for equipment diagnosis. D. L. Iverson and F. A. Patterson-Hine in U.S. Pat. No. 5,581,694 for "Method of Testing and Predicting Failures of Electronic Mechanical Systems" issued December 1996 applied digraph models in a knowledge-based system to analyze and predict failures of an electronic system, such as a flight control system on board a space station. The digraph method associates the failure of a component with a failure event which can be observed. Given a knowledge base of digraph models of systems, the system calculates the one or two components that have caused the failure events.

Therefore, according to the invention, there is provided a method to diagnose an equipment failure using an integrated approach of case based reasoning and reliability analysis. This method uses historical failure data recorded in maintenance transaction management systems and other relevant data such as expected lifetimes of components or machines published by the equipment vendor, or publicly available failure data of standard components (such as standard electronic components), and the symptom of the failure at hand input by the user. The method produces as output a list of suggested failed components in the equipment, ordered by decreasing probability of failure. When the method is implemented in a real-time equipment diagnostic decision support system, it helps the user quickly focus on a few highly probable failed components and therefore reduces the diagnosis time. It also improves the probability that the failed component(s) is correctly identified, reducing the need for further repair or a subsequent failure due to the same, unfixed problem. Because this method integrates two different approaches, it possesses the unique combination of the advantages of both approaches (as discussed above), and yet provides a single, consistent output to the user.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In the situation when a piece of equipment, such as a machine on the production shop floor, has failed, the immediate goal is to diagnose the failure to determine what needs to be done to bring the equipment back to a running state. To this end we propose a decision support system to help the maintenance technician perform the equipment diagnosis.

Figure 1:
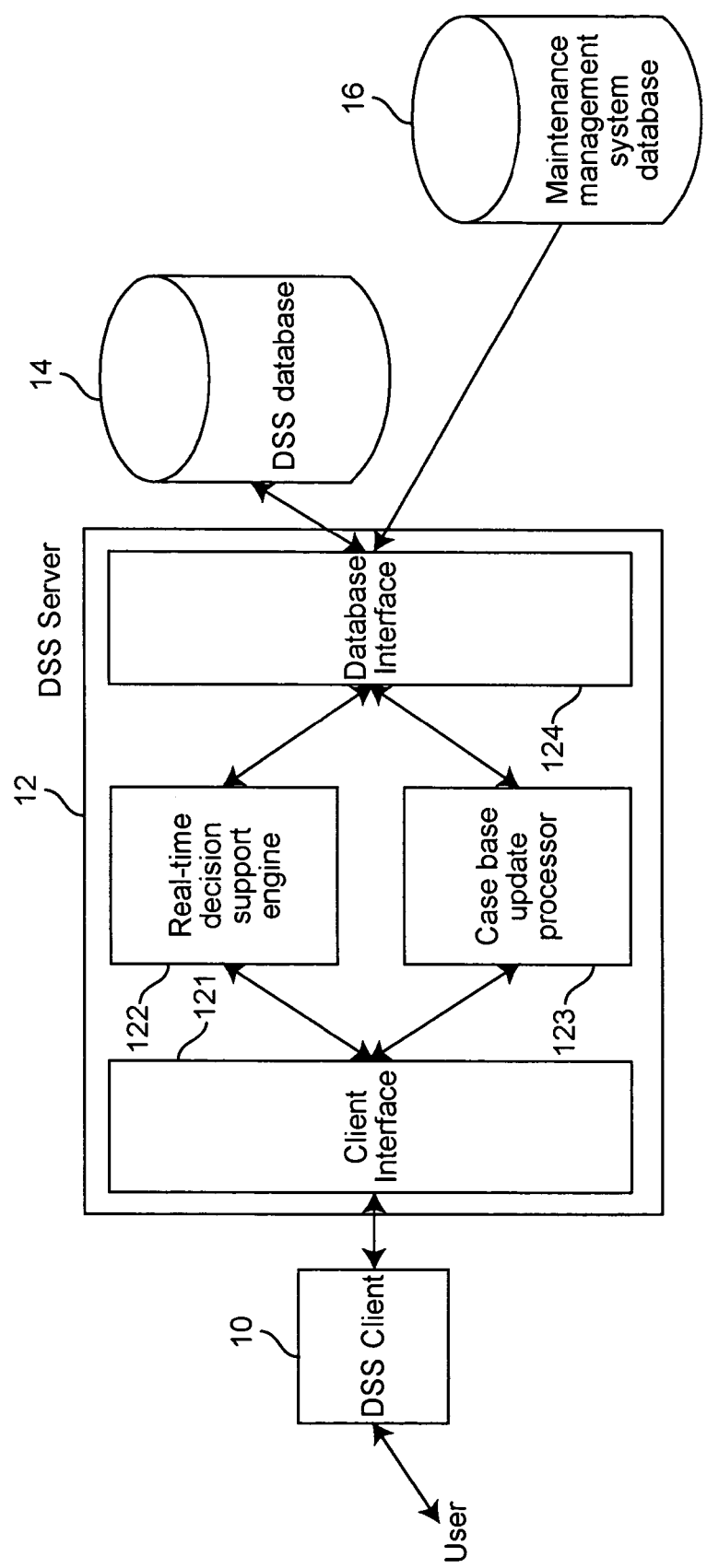
FIG. 1 is a block diagram of the architecture of a real-time decision support system for equipment diagnosis according to the invention.

FIG. 1 shows a typical architecture of such a decision support system (DSS) for equipment diagnosis. Referring to the figure, we describe the decision support system in detail. The DSS client 10 is the user interface to the DSS server 12 through which the maintenance technician interacts with the system. The key inputs to the system, entered by the technician, are the identification of the machine or machine-process combination, a problem description in free form text, or as a selection out of a list of common problem descriptions, or a combination of both. The DSS client 10 will also display the results of the system computation to the technician.

The DSS server 12 includes a client interface 121, which provides the interface to a real-time support engine 122 and a case base update processor 123, and a database interface 124 through which the real-time support engine 122 and the case base update processor access data. The DSS database interface 124 handles all read/write operations performed by the system to its own database 14 (DSS database) and the external database 16 (maintenance management system database). The maintenance management system database 16 is external to the system and is provided by any of the commercial maintenance management systems available. The maintenance management system database 16 contains a detailed transaction record of each machine failure.

The DSS database 14 contains all necessary information for DSS computation to occur. Some of this information is obtained from the maintenance management system database 16, through the execution of the case base update processor 123. The case base update processor 123 reads transaction records from the maintenance management system database 16 after the transactions are closed, and then updates the case base accordingly by extracting the information required by the case base (see characterization of each record of the case base below). The case base is the primary input to the case based reasoning portion of the DSS. Each record of the case base is characterized by:

$X_0$=the identification of the machine or machine-process combination if the machine is capable of more than one process, $X_i$=1, if component i failed; 0 otherwise; i=1, . . . , N, where N is the number of components in the machine, and $X_{N+1}$=a description of the problem as seen by the maintenance technician, where the description can be of free-form text as entered by the technician, or one of a number of standard description provided by the maintenance management system, or a combination of both.

Figure 2:
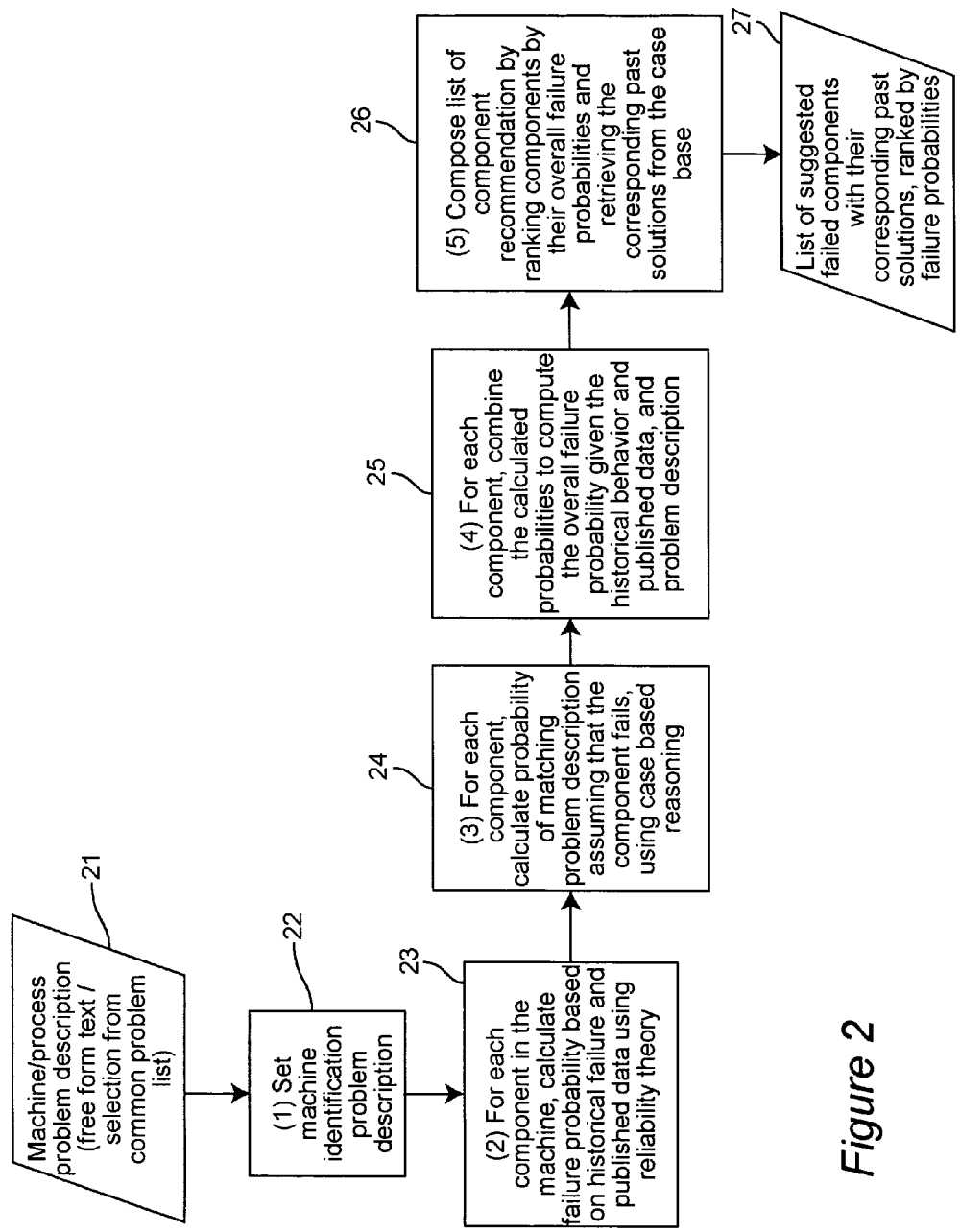
FIG. 2 is a flow diagram showing the high level logic of the method according to the invention.

The real-time decision support engine 122 contains the execution logic of the proposed method, as shown in FIG. 2. It is an implementation of the key part of this invention. The decision support computation is real time because it is performed after the technician enters all the relevant information into the system and it responds to the technician interactively in input block 21. We describe the execution logic as follows.

Consider the set of records corresponding to $X_0$=x and $X_i$=1 where i=k, $X_i$=0 where i≠k, i.e., all records corresponding to component k failures for machine x. Let T be the number of records in this collection, corresponding to the number of failures encountered in the past. The problem description in each record in this collection are different, as they were entered in different occasions or by different technicians, and/or component k can fail for different reasons with different symptoms. Hence, there is a cluster of records corresponding to component k failures for machine x, denoted by cluster $y_k$ and characterized by the vector $(X_0=x, X_i=1$ where $i=k, X_i=0$ where $i \neq k, X_{N+1}=x_{N+1,t})t=1, \ldots, T$. (Within this cluster, there may be sub-clusters corresponding to the different failure modes and hence the fundamentally different problem descriptions.) This concept of clusters has been used in a different context related to case based reasoning in H. Tirri, P. Kontkanen and P. Myllymaki, "A Bayesian framework for case-based reasoning", *Proceedings of the $3^{rd}$ European Workshop on Case-Based Reasoning*, Lausanne, Switzerland, November 1996.

Let P {S} denote the probability of the occurrence of event S. For the failure at hand, the technician enters a machine identification $X_0=x$ and a problem description $X_{N+1}=d$. Our objective to diagnose the failure can be stated as: Given $X_0=x$ and $X_{N+1}=d$, find k* such that $$k^* = \arg\max_k P\left\{X_0 = x, X_i = \begin{cases} 1, & i=k \\ 0, & i \neq k \end{cases}, X_{N+1} = d\right\} \quad (1)$$

where the maximum is taken over $k=1, \ldots, N$. That is, we want to find k* such that component k* has the highest probability of having a failure, given all the available information. Let Y denote the clustering variable as discussed above. It follows that $$P\{X_0 = x, X_i = \begin{cases} 1, & i=k \\ 0, & i \neq k \end{cases}, X_{N+1} = d\} = \quad (2)$$

$$\sum_{k=1}^{N} P\{Y = y_k\} P\left\{X_0 = x, X_i = \begin{cases} 1, & i=k \\ 0, & i \neq k \end{cases}, X_{N+1} = d \mid Y = y_k\right\}$$

We calculate each of the two probabilities in the summand of equation (2), corresponding to the steps of function blocks 22 and 23 in FIG. 2. First, $P\{Y=Y_k\}$ is the probability that component k fails, given that the machine fails, by the definition of our cluster.

$$P\{Y = y_k\} \quad (3)$$
$$= P\{\text{component } k \text{ fails} \mid \text{machine fails}\}$$
$$= P\{\text{component } k \text{ fails}\} / P\{\text{machine fails}\}$$
$$= \frac{\left[\frac{E(D_k)}{E(D_k)+E(U_k)}\right]}{\left[\frac{E(D)}{E(D)+E(U)}\right]},$$

where
$E(D_k)$ is the expected time to repair for component k,
$E(U_k)$ is the expected time between two successive failures for component k (minus the down time),
$E(D)$ is the expected time to repair for the machine, and
$E(U)$ is the expected time between two successive failures for the machine (minus the down time).

The last equality is a well-known result in reliability theory which is remarkably general. (See, e.g., ibid. Barlow, Chapter 8.) To estimate each of these quantities, one of the following ways can be used. We will use E(U) for our discussion and the other quantities follow exactly.

1. Estimate E(U) from the simple average of the times between two successive failures recorded in the maintenance transaction records. When we have a fairly long history of the equipment, this approach provides a good estimate for the particular machines we own.
2. Obtain estimates of E(U) from published data from the equipment vendor or from the open literature where available. The latter case applies to standard electronic components for example. This has the advantage in cases where the equipment is new and its history is short or non-existent.
3. Combine (1) and (2) above so that the advantages of both approaches can be realized. A simple but effective way is to use exponential smoothing as follows. Let $n=0, 1, 2, \ldots$ be the number of times the machine has failed and $u_n$ be the estimate of E(U) at time n. Then $u_0$=estimate from equipment vendor or open literature, $u_n=\lambda u_{n-1}+(1-\lambda)$ (time between failure n and failure n-1), n>0, where $0 \leq \lambda \leq 1$ is a user specified parameter. To facilitate computation, n can be kept in a field of the case base, whose value will be computed during case base update time by the case base update processor.

Now we turn to the second probability in the summand of equation (2), $$P\left\{X_0 = x, X_i = \begin{cases} 1, & i=k \\ 0, & i \neq k \end{cases}, X_{N+1} = d \mid Y = y_k\right\},$$

which is step 3 in function block 24 in FIG. 2. We use the case based reasoning approach to estimate this quantity. Recall that each record in our case base is characterized by $(X_0, X_1, \ldots, X_N, X_{N+1})$. $X_0$ (machine/process identification) and $X_{N+1}$ (problem description) are the two key attributes used in matching an incoming case to a historical case stored in the case base. To facilitate finding the most relevant cases, the machines represented in the case base are organized into a hierarchical structure, the concept of which is shown in FIG. 3.

Figure 3:
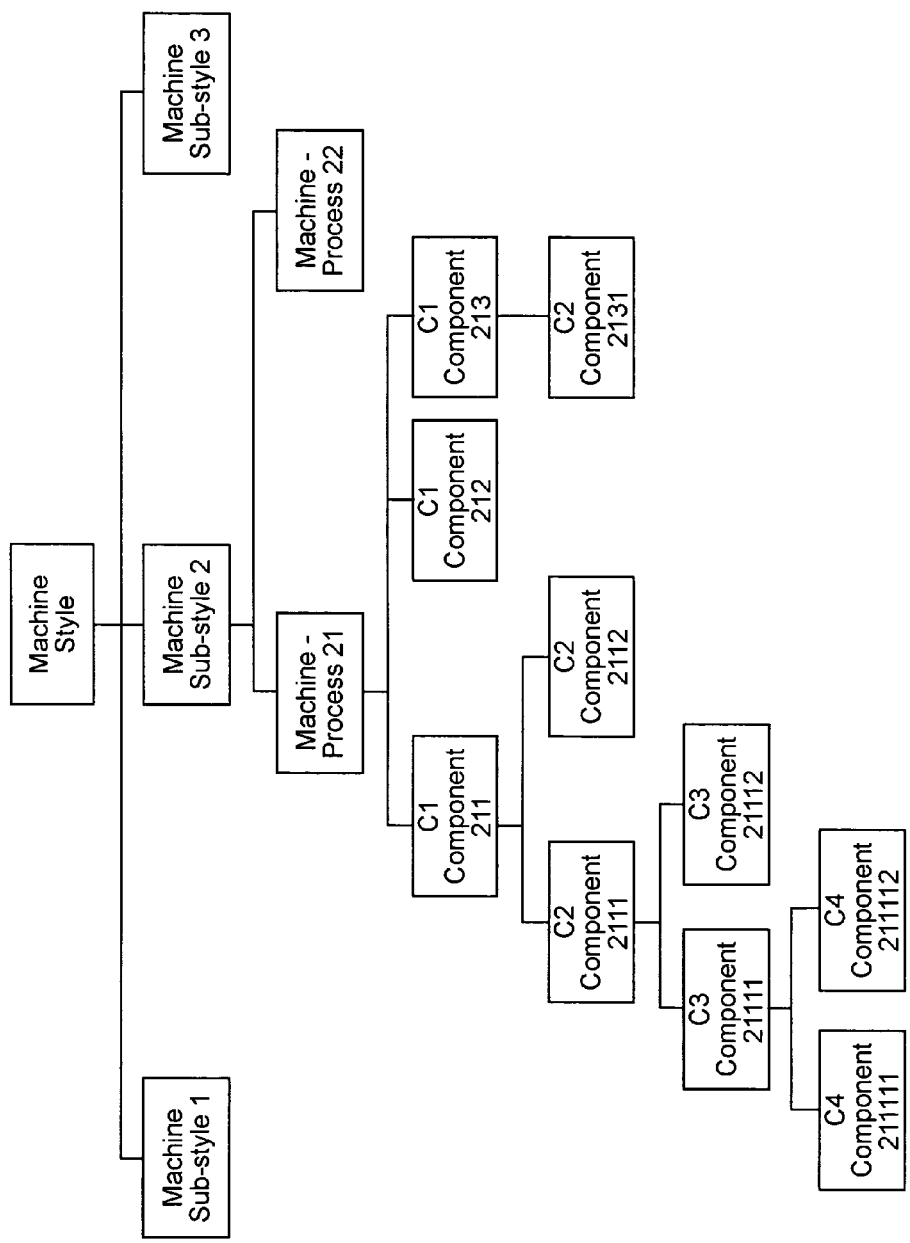
FIG. 3 is an illustration of the machine hierarchy in the case base.

Referring to FIG. 3, all machines are divided into machine styles, which in turn are divided into machine sub-styles, in turn into machine-processes, then into four levels of components. A machine sub-style can be a machine running a set of processes, or a set of machines running the same process. The exact definition and the number of levels of machine styles/sub-styles and components will depend on the specific implementation, based on whether failures are more dependent on machines or processes.

To match $X_0$ and $X_{N+1}$, we use the following logic to retrieve the most relevant cases as much as possible. Using the same notation, let $x_0$ be the machine-process identification and d be the problem description of the incoming case.

Step 1: Find the set of records R with an exact match to $x_0$ at the machine-process level in the machine hierarchy of the case base.

Step 2: If step 1 is unsuccessful, find the set of records R whose machine or process matches exactly to $x_0$ at one level above the level just searched. Repeat this step until successful.

Step 3: In the set R, find a subset R' of records with the distance of $X_{N+1}$ to d within a specified value. Rank the records within this subset R' using the same distance measure. The distance measure can be defined as the degree of an approximate or fuzzy match between the given text d and the value of $X_{N+1}$ in the record. The tools of the text analysis trade can be applied here. For example, general techniques in string and text search or matching are described in S. S. Skiena, *The Algorithm Design Manual*, Springer-Verlag, New York (1997), and G. Salton, *Automatic Text Processing*, Addison-Wesley, New York (1988). More advanced techniques in document retrieval from a database of text documents based on the user input of a word or phrase can also be used (e.g., U.S. Pat. No. 5,761,497 to Holt et al. for "Associative Text Search and Retrieval System that Calculates Ranking Scores and Window Scores", issued June 1998), by treating the problem description field $X_{N+1}$ as the body of a text document. Many of the commercial case-based reasoning systems mentioned above provide some form of text matching.

Then, $$P\left\{X_0 = x, X_i = \begin{cases} 1, & i = k \\ 0, & i \neq k \end{cases}, X_{N+1} = d \mid Y = y_k\right\} = \quad (4)$$

$$\frac{\text{(Number of records in the set } (R' \cap \text{cluster } y_k))}{\text{(Total number of records in cluster } y_k)}$$

The total number of records in cluster $y_k$ is simply the total number of records corresponding to failure of component k. This quantity can be pre-computed for the case base and updated only when the case base is updated with new records. To facilitate computing the set $(R' \cap \text{cluster } y_k)$, at case base update time, each record can be given an index field to indicate what component failure it belongs to, by the case base update processor.

When the case base is small (e.g., when the equipment is new), the total number of records in some clusters may be zero. In these cases, there are not enough historical data to estimate the probability $$P\left\{X_0 = x, X_i = \begin{cases} 1, & i = k \\ 0, & i \neq k \end{cases}, X_{N+1} = d \mid Y = y_k\right\},$$

given a user-specified problem description d. A conservative strategy is to set this probability to one, so that the total probability of the failure belonging to cluster k (the summand for each k in equation (2)) is the probability estimated by reliability analysis, regardless of the specified problem description.

The overall failure probability for each component, equation (2), can then be solved by substituting equations (3) and (4) into equation (2) for each k=1, 2, ..., N. This is step 4 in function block 25 of FIG. 2. Our objective, equation (1), can be solved by searching for the maximum probability over k=1, 2, ..., N. In practice, we want to not only find the maximum, but also provide the user a list of top ranked components by their estimated probability of failure. This list can be obtained by simply including all components whose probability of failure is above a certain user-specified value and ranking them according to the calculated failure probabilities. For each component, the relevant past solutions retrieved from the case base can also be presented at the same time. This is the key output of the invention. This completes step 5 in function block 26 of FIG. 2. The output 27 is a list of failed components with their corresponding past solutions, ranked by failure probabilities.

A straightforward extension of this method can be used to handle situations where the user specified not just the machine, but also a component at some level in the machine hierarchy, i.e., $X_0$ is specified at some component level. This might be the case when the technician has determined from his experience that a certain component or sub-assembly within the machine is at fault and wants to investigate within that component only. The same method described above applies, except that it now works at the specified component level, i.e., the description of the above method applies with the word "machine" replaced by "component" and all the straightforward changes following that.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method to diagnose equipment failures using an integrated approach of case-based reasoning and reliability analysis, comprising the steps of:

collecting a statistical reliability data for each of a plurality of given equipments and for each of the hardware components of said equipment, said collecting including calculating a statistical average time between two successive failures of the equipment, calculating a statistical average time between successive two failures for each of said hardware components, calculating a statistical average time to repair failures of the equipment and calculating a statistical average time to repair failures of each of its hardware components;

constructing a case base database for each of the equipment, wherein each case based database record comprises at least four fields, including a failed equipment identifier field, a failed component identifier field, a failure description text field, and a solution record field;

receiving an equipment problem description from a user, said description including a problem equipment identifier and a problem description text;

generating for each of said hardware components a conditional statistical probability of said component having a failed state given that the equipment identified by the user-input problem equipment identifier has a failed state, based on said collected statistical reliability data;

matching the problem description test input by the user to the failure description text field of the case base database records to calculate a case-based probability for each of said hardware components associated with said failed state;

generating a list of component troubleshooting recommendations based on said generated conditional statistical probabilities and said calculated case base probabilities; and displaying said list of generated troubleshooting recommendations.

2. A decision support system to diagnose equipment failures using an integrated approach of case-based reasoning and reliability analysis, comprising:

a statistical reliability database storing a statistical reliability data representing, for each of a plurality of given equipments and for each of the hardware components of said equipment, a statistical average time between two successive failures of the equipment, the statistical average time between two successive failures for each of its hardware components, the statistical average time to repair failures of the equipment and the statistical average time to repair failures of each of its hardware components;

a case base maintenance management system database for the equipment wherein each case base database record comprises at least four fields, including a failed equipment identifier field, a failed component identifier field, a failure description text field, and a solution record field;

a decision support system database;

a decision support system client for receiving an equipment problem description from a user, said description including a problem equipment identifier and a problem description text;

a decision support system server receiving input from the decision support system client and accessing said case base maintenance management system database and said decision support system database, said decision support system server including a real-time decision support system engine for calculating failure probability for each hardware component in the equipment, wherein said engine is arranged to receive an equipment problem description from a user, said description including a problem equipment identifier data and a problem description text;

arranged to generate, for each of said hardware components a conditional statistical probability of said component having a failed state given that the equipment identified by the user-input problem equipment identifier has a failed state, based on said collected statistical reliability data;

arranged to match the problem description test input by the user to the failure description text field of the case base database records to calculate a case-based probability for each of said hardware components associated with said failed state;

arranged to generate a list of component troubleshooting recommendations based on said generated conditional statistical probabilities and said calculated case base probabilities, and arranged to display said a list of component troubleshooting recommendations ranked by said generated conditional statistical probabilities and said calculated case base probabilities computed for each hardware component, and to retrieve corresponding past solutions from the case base maintenance management system database; and a case base update processor for copying closed failure transaction records from the case base maintenance management systems database, and extracting information from these transaction records to obtain attributes required by said real-time decision support system engine, and indexing each closed failure transaction record by a failed component identification and a number of occurrence of failure of that particular component.

* * * * *